Nov. 13, 1956
J. T. KRAPP
2,770,474
VALVED SEPARABLE COUPLING
Filed Dec. 23, 1952
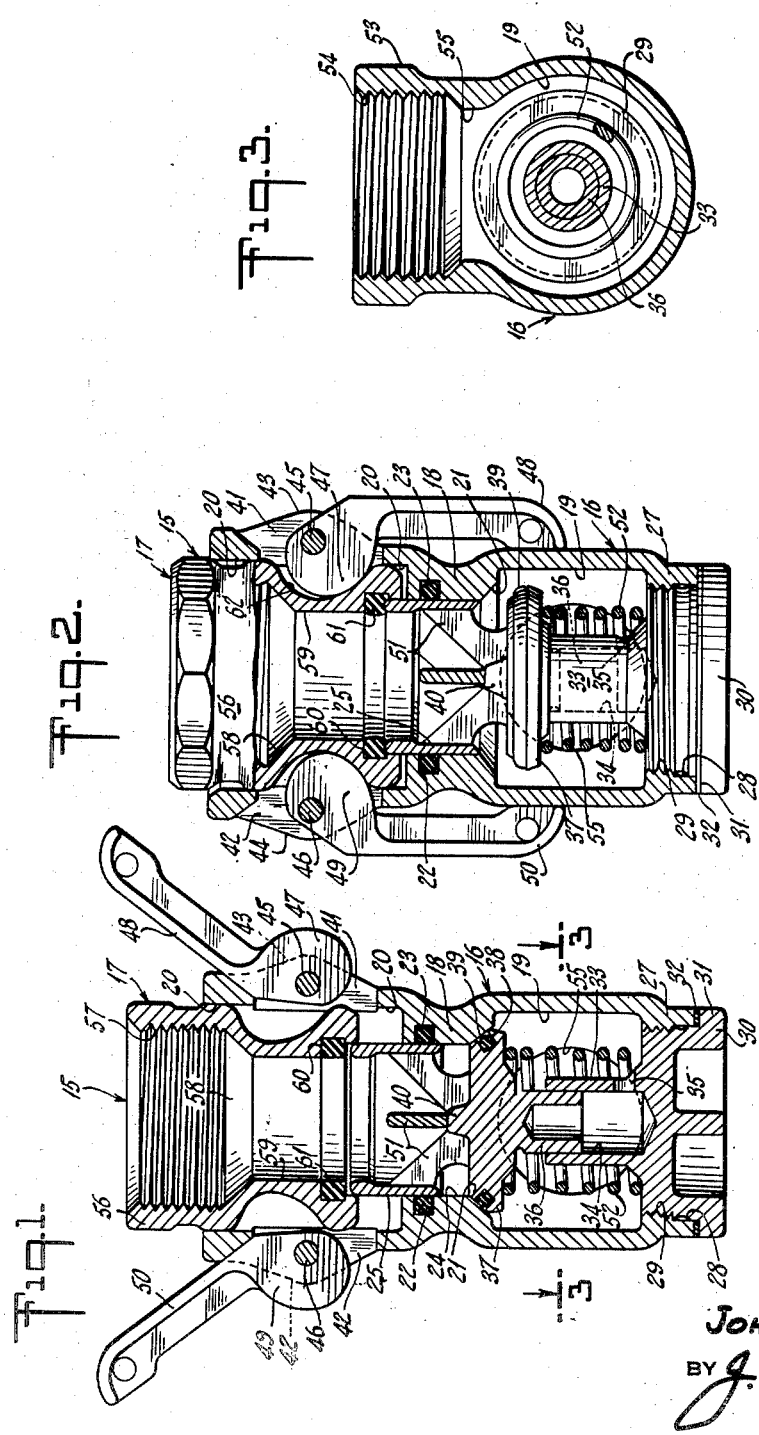
INVENTOR
JOHN T. KRAPP.
BY
ATTORNEY

2,770,474
VALVED SEPARABLE COUPLING
John T. Krapp, Port Washington, N. Y.

Application December 23, 1952, Serial No. 327,601

1 Claim. (Cl. 284—18)

*Quickly separable couplings with a valve in one member thereof*

This invention relates to improvements in quickly separable couplings, and relates more particularly to a pair of cooperative coupling members which are forced together by means of cams, provision having been made for substantial movement of the members axially during the act of forcing them together and utilizing this movement to effect the opening of a valve in one of said members, and to allow said valve to close when the members are being disconnected.

Another object of the invention is the provision, in a separable coupling, of a valve and a seat in at least one of said members, and means in said coupling normally urging said valve and said seat into fluid tight relation.

Other objects and advantages of the invention will be apparent to those skilled in the art, upon a study of this specification and the accompanying drawings.

Referring to the drawings;

Figure 1 is a sectional elevation of my new and improved quickly separable coupling having a valve in one of the members, the male member being shown as positioned in the female member just prior to clamping the two together;

Figure 2 is a sectional elevation similar to Figure 1 with the exception that the two members have been clamped together and the valve in the female member is opened; and Figure 3 is a sectional view taken along the lines 3—3 of Figure 1.

Referring to Figures 1, 2, and 3, the coupling 15 is comprised of a female or socket member 16 and a male member 17. The member 16 has an annular web 18 therein between an axial passage 19 and a counterbore 20. The annular web has a beveled surface 21 which forms a valve seat, and spaced apart from this seat is an annular groove 22 which carries an O ring 23.

The annular web 18 has an interior bore or axial passage 24 formed therein and reciprocally carried in this passage is a sleeve 25, the outer surface of which forms a seal with the O ring 23.

A boss 27 is formed on the lower end of the body of the female member 16 and this boss carries a counterbore 28 which communicates with a threaded hole 29 which is concentric with the axial passage 24 referred to above. A plug member 30 has a shoulder 31 which overlies a gasket 32 between it and the lower end of the boss 27 to form a fluid tight seal. The member 30 has its exterior surface stepped to match the counterbore and threaded to mate with the threads 29. The plug member 30 also has a boss 33 formed integral therewith and this boss has an interior bore 34 which communicates with the interior of the passage 19 via a hole 35.

Reciprocally mounted in the bore 34 is the stem 36 of a valve 37. The valve 37 has a beveled face which matches the beveled face 21 in the body and to effect an easy seal, the beveled face of the valve head 37 has an annular groove 38 which carries an O ring 39. The valve head has a knob 40, the purpose of which will be presently described.

The bore 20 has aligned slots 41 and 42 formed therein, leaving therebetween bosses such as the bosses 43 and a companion boss therefor, not shown, and 44 and a companion boss therefor, not shown. These bosses and their companions have aligned holes therein to support the shafts 45 and 46 respectively. Journaled on the shaft 45 is a cam member 47 having formed integral therewith a lever 48. Journaled on the shaft 46 is a cam 49 which may be identical with the cam 47 and this cam also has formed integral therewith a lever designated by the numeral 50.

The valve head 37 has mounted thereon a spider 51, the outer periphery of the legs of which form a tight fit in the sleeve 25. A helical spring 52 embraces the boss 33, bears against the plug member 30 and urges the valve head 37 upwardly.

The body 16 has a rearwardly extending boss 53 which may best be seen in Figure 3. This boss has a threaded passage 54 formed therein to accommodate a pipe or fitting and a passage 55 between it and the passage 19 permits free flow of a fluid medium therethrough.

The male member 17 has a boss portion 56, the outer diameter of which forms a working fit in the bore 20. This boss portion has a threaded bore 57 to which a pipe or a fitting may be secured. Communicating with the passage 57 is a tapered passage 58 which communicates with a bore 59 which is preferably concentric with the bore 57. A counterbore 60 is formed in the lower end in the member 17 and communicates with the passage 59 and carries a gasket 61 of rectangular cross-section and is sufficiently soft for the upper rounded edge of the sleeve 25 to distort. On the exterior the male member has an annular groove 62 with which the cams 47 and 49 cooperate to force the two members into fluid tight relation when assembling the coupling or for freeing said members when it is desired to separate them.

In Figure 1, the two coupling members are shown positioned together just before the gasket 61 is engaged by the upper end of the sleeve 25. It is noted that the valve head is seated against the beveled or angular face 21 formed in the interior of the member 16 and urged into sealed relation therewith by the spring 52. Now when the male member moves to the point where the sleeve 25 and the gasket 61 are in contact, the levers 48 and 50 may be swung downwardly causing the cams 47 and 49 respectively to engage the annular groove 62 and force the male member downwardly. As this occurs, the pressure effects a seal between the gasket 61 and the sleeve 25, and since the latter is sealed by the O ring 23 there is no leakage to the atmosphere even though the coupling is connected to a source of fluid under pressure. As the levers 48 and 50 are swung downwardly to the position shown in Figure 2, the further downward movement of the male member causes the sleeve 25 to move downwardly and through the spider 51 pressure is exerted on the valve head 37 against the urge of the spring 52 and as the levers 48 and 50 reach their final downward position the valve 37 is spaced apart from the seat 21 so that the fluid medium may flow freely through the coupling.

Although I have herein shown and described one form of my new and improved coupling having valve means therein which automatically open when the couplings are placed in engagement and which automatically close as the couplings are separated, it is obvious that many changes may be made in the arrangements herein shown and described within the scope of the following claim.

I claim:

In a separable coupling device, a female member comprising a tubular body having an axial passage therein of one diameter and a second axial passage of a larger diameter with a valve seat formed therebetween, a valve reciprocally carried in said body, means constantly urging said valve into engagement with said seat, a sleeve reciprocally carried in said first passage with one end adjacent to said valve seat, said sleeve having a sealing face formed on the other end thereof, annular gasket means carried in said first passage in fluid-tight relation with said sleeve, a spider carried by the head of said valve and internally engaged with said sleeve so that the sleeve and the valve move in unison, a third passage in said member joining and larger in diameter than said first passage, cam levers carried on said body and having cams extending into said third passage, a male member inserted in said third passage and having a passage therethrough, a sealing ring adjacent to one end of said last member, and an external annular groove adjacent to said last end and releasably engaged by the cams of said cam levers for forcing said members together axially, whereby said sealing ring is first brought into engagement with the sealing face on the end of said sleeve, effecting a seal between said members, and further movement of said members by said cams causes the sleeve to move axially and open said valve.

References Cited in the file of this patent

UNITED STATES PATENTS

| | | |
|---|---|---|
| 769,688 | Cederstrom | Sept. 13, 1904 |
| 770,570 | Geddes | Sept. 20, 1904 |
| 1,064,862 | Sharp | June 17, 1913 |
| 1,278,300 | Brooks | Sept. 10, 1918 |
| 2,361,866 | Norway | Oct. 31, 1944 |
| 2,441,075 | Krapp | May 4, 1948 |
| 2,634,927 | Smith et al. | Apr. 14, 1953 |
| 2,690,917 | Chandler | Oct. 5, 1954 |